(12) United States Patent
Paluncic et al.

(10) Patent No.: US 8,469,150 B2
(45) Date of Patent: Jun. 25, 2013

(54) LUBRICANT DISTRIBUTOR

(75) Inventors: Zdravko Paluncic, Ludwigshafen (DE); Ralf Trinkel, Gerolsheim (DE)

(73) Assignee: Lincoln GmbH, Walldorf (DE)

( * ) Notice: Subject to any disclaimer, the term of this patent is extended or adjusted under 35 U.S.C. 154(b) by 76 days.

(21) Appl. No.: 12/704,999

(22) Filed: Feb. 12, 2010

(65) Prior Publication Data

US 2010/0206667 A1    Aug. 19, 2010

(30) Foreign Application Priority Data

Feb. 14, 2009  (DE) .................... 20 2009 002 574 U
Mar. 3, 2009   (DE) .................... 20 2009 002 951 U
Mar. 25, 2009  (DE) .................... 20 2009 004 167 U

(51) Int. Cl.
*F16N 27/00*         (2006.01)

(52) U.S. Cl.
USPC .......................................................... 184/7.4

(58) Field of Classification Search
USPC .......................................................... 184/7.4
See application file for complete search history.

(56) References Cited

U.S. PATENT DOCUMENTS

| 2,448,583 | A | * | 9/1948 | Fox ................................ 184/7.4 |
| 2,550,535 | A | * | 4/1951 | Davis ............................ 184/7.4 |
| 2,556,968 | A | * | 6/1951 | Jakobsen ...................... 184/7.4 |
| 3,664,462 | A | * | 5/1972 | Smith, Sr. ..................... 184/7.4 |
| 3,715,013 | A | * | 2/1973 | Lyth et al. .................... 184/7.4 |
| 4,397,376 | A |   | 8/1983 | Saretzky |
| 4,572,331 | A | * | 2/1986 | Powell et al. ................. 184/7.4 |
| 5,799,751 | A | * | 9/1998 | Winkler et al. .............. 184/6.14 |
| 6,827,299 | B2 | * | 12/2004 | Scotchmur et al. .......... 239/583 |
| 6,863,157 | B2 | * | 3/2005 | Conley et al. ................. 184/7.4 |

FOREIGN PATENT DOCUMENTS

DE    2064324 B2   7/1972
DE    3743998 A1   7/1988

OTHER PUBLICATIONS

Extended European Search Report regarding 10153402.21-2311, dated May 28, 2010, 10 pages.

\* cited by examiner

*Primary Examiner* — William E Dondero
*Assistant Examiner* — Minh Truong
(74) *Attorney, Agent, or Firm* — Senniger Powers LLP

(57) ABSTRACT

A lubricant distributor comprising a progressive distributor and a single-line metering valve is disclosed. An outlet of the single-line metering valve is in fluidic connection, or can be brought into fluidic connection, with an inlet of the progressive distributor.

8 Claims, 2 Drawing Sheets

LUBRICANT DISTRIBUTOR

FIELD OF INVENTION

The invention relates to a lubricant distributor with a progressive distributor, with which, for example, the lubricant output of a single-line distributor can be divided for up to 20 friction sites, for example.

BACKGROUND OF INVENTION

Progressive distributors are conventionally known. A progressive distributor consists of several distributor segments, each having a piston provided with annular grooves that is alternately pressed in two directions by a lubricant, generally lubricating grease or lubricating oil. With the aid of their annular grooves, the pistons are controlled in a defined sequence such that the next piston can be displaced only when the piston motion of the preceding piston is nearly finished. All piston bores are directly connected to the outlet. The progressive distributors can be stopped and restarted in any desired position.

For such progressive distributors of the type used, for example, in central lubrication systems, there is the need for a lasting, reliable and precise metering of the lubricant amount.

SUMMARY OF THE INVENTION

The invention serves the aforesaid objective by the novel combination of a conventionally known progressive distributor with a single-line metering valve by virtue of the fact that one outlet of the single-line metering valve is, or can be brought into, fluidic connection with the inlet of the progressive distributor. In this manner, metered amounts of lubricant can always be supplied to the progressive distributor one after the other.

The objectives, advantages and application possibilities of the invention emerge from the following description of exemplary embodiments with reference to the drawings. All described and/or graphically displayed characteristics, on their own or in any desired combination, constitute the subject matter of the invention, even independently of combination in individual claims and/or their references.

BRIEF DESCRIPTION OF THE DRAWINGS

These show schematically.

Corresponding reference numbers designate corresponding parts throughout the Figures.

DETAILED DESCRIPTION

Figure 1C:
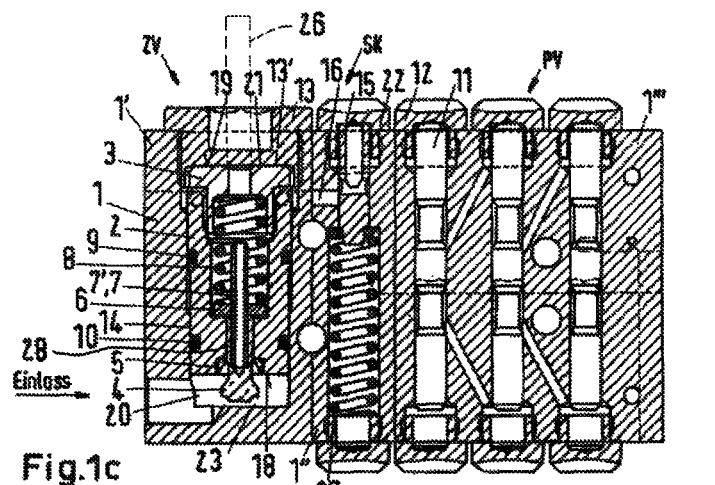
FIGS. 1a-1c illustrate a lubricant distributor of this invention in a plan view (FIG. 1a), a front view (FIG. 1b), and in the section along A-A in FIG. 1b (FIG. 1c)

The graphically presented exemplary embodiment of a lubricant distributor contains in a housing 1, one piece in this case, a single-line metering valve ZV, a control piston device SK and a progressive distributor PV, constructed in respective housing sections (valve housing 1', control piston housing 1" and progressive distributor housing 1'''), wherein the three housing sections 1', 1", 1''' can selectively also be individually produced and flanged together in order to be in fluidic connection to one another.

The single-line metering valve ZV comprises valve housing 1', which is supplied in operation with liquid or viscous lubricant, a cylindrical cavity 14 in which a differential piston 2 is movably seated, sealed from the exterior by means of O-ring seals 9, 10. In differential piston 2, a valve piston 7 is in turn seated, movably against a restoring force exerted by means of compression spring 8 and washer 6, between a position (the lower one shown in FIG. 1c) opening a flow passage through differential piston 2 and a position cutting off the flow passage through differential piston 2. With its smaller end face 18, together with valve body 4 of valve piston 7, differential piston 2 delimits an inlet chamber 20, and with its larger end face 19, an outlet chamber 21. In the smaller end face 18 of differential piston 2, a conical sealing surface is formed by means of a seal 5, against which valve body 4 of valve piston 7 can rest tightly with a correspondingly conical sealing surface upon displacement of differential piston 2 from the top to the bottom in the drawing. Valve piston 7 has, at least in certain areas, a cylindrical outer surface 27 for sealing contact with the inside surface 28, correspondingly cylindrical in certain areas, of differential piston 2, and the outer surface 27 of valve piston 7 is furnished with a groove 29, preferably helical, via which inlet chamber 20 can be brought into fluidic connection with outlet chamber 21. In the illustrated exemplary embodiment, valve piston 7 has a tightening rod 7'. The passage of differential piston 2 is closed off at its upper end in the drawing by differential piston screw 3, on which sits the compression spring 8, which rests at its lower end in the drawing against a washer 6, supported on the inside. The cavity 14 is in turn closed off at the top with valve closure screw 13 that can form a stop 13' for differential piston screw 3 when differential piston 2 is moved upwards in the drawing to load progressive distributor PV.

Figure 1B:
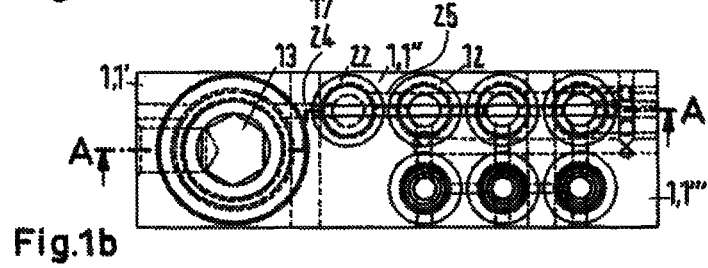
Figure 1A:
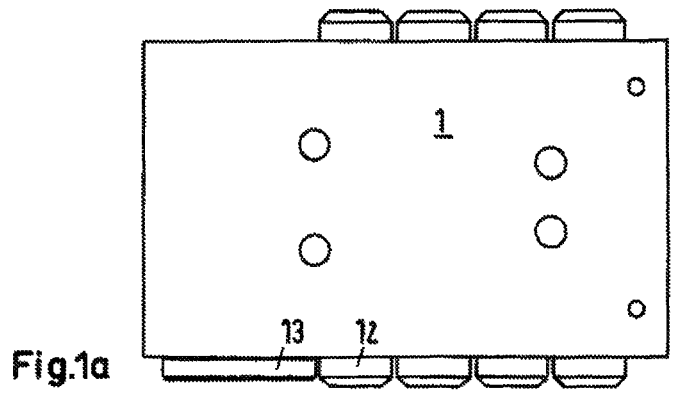
Figure 2:
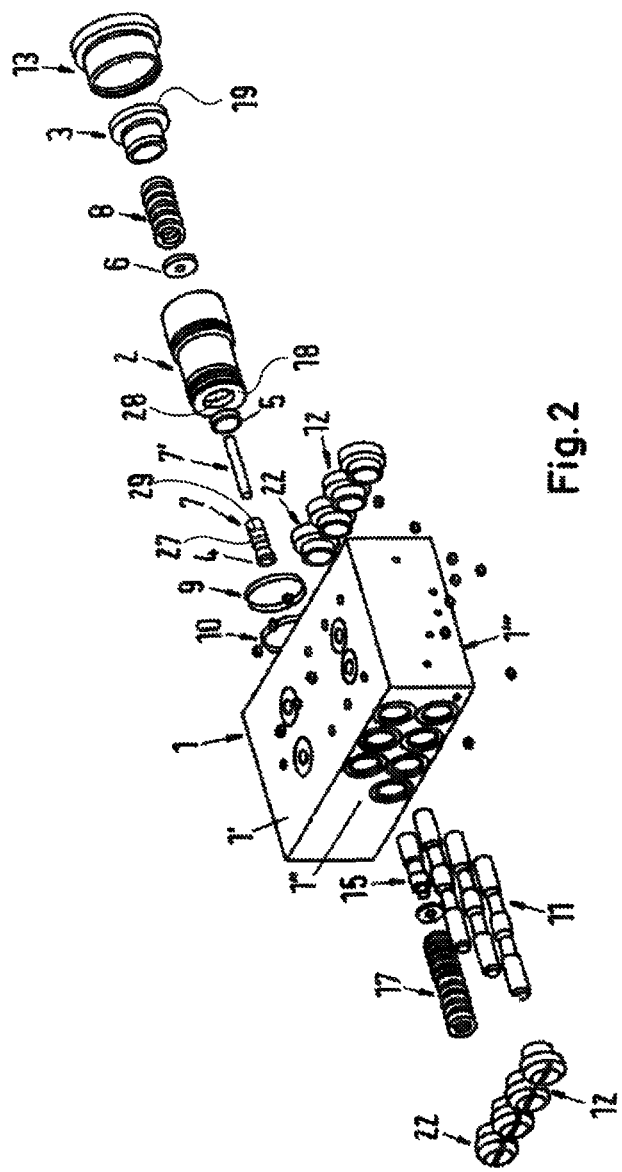
FIG. 2 illustrates the lubricant distributor according to FIGS. 1a-1c in an oblique exploded view.

One outlet 24 (Fig. 1b) of outlet chamber 21 opens via an inlet channel 16 into control piston housing 1", in the cavity of which a control piston 15 is pressed by a compression spring 17 in the closing direction relative to an inlet 25 of progressive distributor PV (see Fig. 1b). The housing bore of control piston 1" is closed off at the top in the drawing by a control piston closure screw 22.

The inlet 25 of the progressive distributor PV is connected to control piston device SK in the flow direction. In particular, the control piston device SK is connected to the progressive distributor PV via the outlet 24 of the outlet chamber 21, the channel 16, and the inlet 25 of the progressive distributor. The progressive distributor PV has, in the usual manner, a specified number, three in the present case, of annular groove pistons 11, with which six friction sites can be supplied with lubricant. The bores for receiving annular groove pistons 11 in progressive distributor housing 1''' are closed off at the top in the drawing by respective progressive distributor closure screws 12.

The functional principle is as follows. In operation, the lubricant reaches the lateral inlet into housing body 1' in housing 1 from a lubricant pump, for example. In the home position, the valve formed by valve body 4 and seal 5 in differential piston 2 is open. The lubricant can flow freely through differential piston 2 past the valve constriction. At this time, control valve 15 of control valve device SK is still held in the closed position by the restoring force of compression spring 17.

If a sufficient amount of lubricant is pumped into the lubricant distributor that pressure builds up inside it, differential piston 2 moves, because of the size difference between its end faces 18 and 19, downward in the drawing until valve 4, 5 closes because of the contact on inlet chamber bottom 23. In this pre-metering phase lasting until the closure of valve 4, 5, outlet chamber 21 is filled with lubricant via differential piston 2.

If valve 4, 5 is closed, the pressure in inlet chamber 20 further increases in case of additional supplying of lubricant until the pressure in outlet chamber 21, converted by the larger end face 19 of differential piston 2, is sufficiently high to displace control piston 15 against the restoring force of compression spring 17 and thus open the passage to progressive distributor PV. As soon as control piston 15 has opened the channel to progressive distributor PV, differential piston 2 with valve 4, 5 closed can be pushed upwards by the built-up lubricant pressure. In this way, a predetermined amount of lubricant on the upper side of differential piston 2 is pressed into the downstream progressive distributor PV, which distributes it uniformly to the six outlets provided in this case.

The lubrication cycle is ended as soon as differential piston 2 has reached its stop 13' on valve closure screw 13. The pressure in the main line to inlet chamber 20 is now relieved. With this pressure relief, valve 4, 5 is opened by the restoring force of compression spring 8 in differential piston 2, whereby the latter moves somewhat downward in the drawing to equalize the pressure. Control piston 15 closes the channel to progressive distributor PV. The home position has again been reached.

The stop 13' for differential piston 2 that is formed by closure screw 13 can be replaced by a different closure edge in combination with a control pin that constitutes a stroke limitation to set the respective metered amount.

Illustrated in phantom lines in Fig. 1c is a control pin 26 that is mounted on differential piston 2 and projects outwards to guarantee a visual monitoring capability for the functioning of the lubricant distributor from the outside.

The progressive distributor and the single-line metering valve are thus to be brought into fluidic connection with one another via a control piston device by leading the outlet of the single-line metering valve into a control piston device such that, under the pressure generated in the single-line metering valve, a control piston can be shifted against a restoring force from a closed position with respect to the inlet channel of the progressive distributor into an opened position.

The housing of the single-line metering valve (the valve housing) can comprise, for example, a cylindrical cavity in which a differential piston is movably seated. In the differential piston, a valve piston can in turn be seated, movably against a restoring force, between a position opening a flow passage through the differential piston and a position cutting off the same flow passage. The differential piston can delimit an inlet chamber with its smaller end face, together with the valve piston, and with its larger end face, an outlet chamber. The outlet of the single-line metering valve can lead from the outlet chamber into the control piston device in such a manner that a control piston can be shifted under the pressure in the outlet channel against a restoring force from a closed position with respect to the inlet of the progressive distributor into an opened position.

In this manner, a respectively specified amount of lubricant can be output to the progressive distributor, corresponding to the dimensioning of the outlet chamber and the displacement path of the differential piston, utilizing the operation mode of the control piston device.

For precise metering, it can further be provided in a refinement of the invention that an adjustable (preferably continuously adjustable) stop, with which the amount of lubricant to be metered can be easily specified, is provided in the movement path of the differential piston The functioning of the invented lubricant distributor can be easily monitored by providing an externally visible monitoring pin for indicating the position of the differential piston.

The valve function of the single-line metering valve is implemented in that the differential piston and the valve piston form cooperating, preferably conical, sealing surfaces.

To guarantee lasting functionality and reliability, it is further provided within the scope of the invention that the valve piston has, at least in certain areas, a cylindrical outer surface for sealing contact with the inside surface, correspondingly cylindrical in certain areas, of the differential piston, and that the outer surface of the valve piston is furnished with a groove, preferably helical, via which the inlet chamber can be brought into fluidic connection with the outlet chamber.

The progressive distributor and/or control piston device and/or single-line metering valve components can be especially advantageously formed in a single one-piece housing for the sake of simplicity. It is also possible, however, to provide the individual components in respective housings of their own, which can flanged together and thereby used more flexibly. Also, only two of the respective adjacent components can be put together in a one-piece housing body, while the third component can be flanged on.

List of Reference Characters

1 Housing body
1' Valve housing
1" Control valve housing
1''' Progressive distributor housing
2 Differential piston
3 Differential piston screw
4 Valve body
5 Seal
6 Washer
7 Valve piston
7' Tightening pin
8 Compression spring
9 O-ring seal
10 O-ring seal
11 Annular groove piston
12 Progressive distributor closure screws
13 Valve closure screw
13' Stop
14 Cavity
15 Control piston
16 Inlet channel
17 Compression spring
18 Smaller end face
19 Larger end face
20 Inlet chamber
21 Outlet chamber
22 Control piston closure screw
23 Inlet chamber bottom
PV Progressive distributor
SK Control piston device
ZV Single-line metering valve

The invention claimed is:

1. Lubricant distributor with a progressive distributor and a single-line metering valve for delivering a metered amount of lubricant to the progressive distributor, wherein an outlet of the single-line metering valve is in fluidic connection, or can be brought into fluidic connection, with an inlet of the progressive distributor, and wherein the single-line metering valve comprises a valve housing with a cylindrical cavity in which a differential piston is movably seated in a sealed state and in which a valve piston is in turn movable between a position opening a flow passage through the differential piston and a position cutting off the flow passage through differential piston against the force of a restoring force, wherein the differential piston has a smaller end face and a larger end face, and wherein the smaller end face and valve piston delimit an inlet chamber and the larger end face delimits an outlet chamber, and wherein an adjustable stop is provided in a movement path of the differential piston to adjust the metered amount of lubricant delivered by the single-line metering valve to the progressive distributor.

2. Lubricant distributor according to claim 1, characterized in that the progressive distributor and single-line metering valve are in, or can be brought into, fluidic connection with one another via a control piston device, wherein an outlet of the single-line metering valve leads into the control piston device such that, under the pressure generated in the single-line metering valve, a control piston can be shifted against a restoring force from a closed position with respect to the inlet of the progressive distributor into an opened position.

3. Lubricant distributor according to claim 2, characterized in that at least two of the progressive distributor, control piston device, and single-line metering valve are contained in one housing body.

4. Lubricant distributor according to claim 3, characterized in that a visible monitoring pin is provided on the differential piston for displaying a position of the differential piston.

5. Lubricant distributor according to claim 3, characterized in that the valve piston has, at least in certain areas, a cylindrical outer surface for sealing contact with an inside surface, correspondingly cylindrical in certain areas, of the differential piston, and in that the outer surface of the valve piston is furnished with a groove via which the inlet chamber can be brought into fluidic connection with the outlet chamber.

6. Lubricant distributor according to claim 1, characterized in that a visible monitoring pin is provided on the differential piston for displaying a position of the differential piston.

7. Lubricant distributor according to claim 1, characterized in that the differential piston and valve piston form cooperating-sealing surfaces.

8. Lubricant distributor according to claim 1, characterized in that the valve piston has, at least in certain areas, a cylindrical outer surface for sealing contact with an inside surface, correspondingly cylindrical in certain areas, of the differential piston, and in that the outer surface of the valve piston is furnished with a groove via which the inlet chamber can be brought into fluidic connection with the outlet chamber.

\* \* \* \* \*